United States Patent
Biel et al.

(10) Patent No.: US 7,294,842 B2
(45) Date of Patent: Nov. 13, 2007

(54) CAMERA HEAD FOR FAST REPRODUCTION OF A VACUUM UV SPECTROMETER SPECTRUM

(76) Inventors: Wolfgang Biel, Tilgenkampstrasse 3, 52428 Jülich (DE); Alfred Scholl, Prämienstrasse 140, D-52223, Stolberg (DE); Norbert Sandri, Prinzengracht 39, D-52428 Jülich (DE); Gerd Telemann, Kaplanstrasse 5, D-52383 Niederzier (DE); Dietmar Brinkmann, Unterstrasse 11, D-52459 Inden-Frenz (DE)

( * ) Notice: Subject to any disclaimer, the term of this patent is extended or adjusted under 35 U.S.C. 154(b) by 187 days.

(21) Appl. No.: 10/492,003

(22) PCT Filed: Oct. 4, 2002

(86) PCT No.: PCT/EP02/11153

§ 371 (c)(1), (2), (4) Date: Dec. 10, 2004

(87) PCT Pub. No.: WO03/034006

PCT Pub. Date: Apr. 24, 2003

(65) Prior Publication Data
US 2005/0105086 A1    May 19, 2005

(30) Foreign Application Priority Data
Oct. 10, 2001  (DE)  ............... 101 50 071

(51) Int. Cl.
*G01T 5/08* (2006.01)

(52) U.S. Cl. .................................. 250/458.1

(58) Field of Classification Search ........... 250/390.08, 250/458.1, 459.1; 356/224, 317
See application file for complete search history.

(56) References Cited

U.S. PATENT DOCUMENTS 3,447,249 A    6/1969  Greger
4,465,370 A *  8/1984  Yuasa et al. ................ 356/224
5,565,982 A * 10/1996  Lee et al. .................... 356/317

FOREIGN PATENT DOCUMENTS

EP  0 355 174 B1  2/1993

OTHER PUBLICATIONS

R. J. Fonck, A. T. Ramsey, and R. V. Yelle, "Multichannel grazing-incidence spectrometer for plasma impurity diagnosis: SPRED," Applied Optics, vol. 21, No. 12, pp. 2115-2123 (Jun. 1982).*
R. J. Fonck et al, "Multichannel grazing-incidence spectrometer . . . " Applied Optics, vol. 21, No. 12 pp. 2115-2123 (Jun. 1982).

* cited by examiner

*Primary Examiner*—Constantine Hannaher
(74) *Attorney, Agent, or Firm*—Schweitzer Cornman Gross & Bondell LLP (57) ABSTRACT

An apparatus for measuring the transport time of impurity particles in a plasma includes a spectrometer, a system for the spatially-resolving conversion into charge of light exiting the spectrometer, an integrator circuit for the spatially-resolving integration of the charge, as well as a display screen that presents the integrated charge as a series of spectral lines. The integrator circuit is assembled from discrete components. Thus, the transport of plasma impurities can be properly measured.

6 Claims, 7 Drawing Sheets

CAMERA HEAD FOR FAST REPRODUCTION OF A VACUUM UV SPECTROMETER SPECTRUM

FIELD OF THE INVENTION

The invention relates to an apparatus for measuring the transport time of impurity particles in a plasma, comprising a spectrometer and a line-scan camera. The spectrometer has an entrance slit. The spectral lines emitted by the impurity particles fall through the entrance slit. Then, the spectral lines fall onto a diffraction grating. Depending on wavelength, the spectral lines are reflected at different angles. The split light signals leaving the spectrometer are collected by a spatially-resolving line-scan camera. The transport time is calculated from the measurement information thus obtained. During operation, the spectrometer is located in a vacuum atmosphere.

BACKGROUND OF THE INVENTION

For the experimental examination of the radial transport of plasma impurities, i.a. a small amount of a plasma impurity is introduced into the plasma at the plasma edge, and then, the development in time of the spectral lines of different degrees of ionization is measured. In such experiments, which are described e.g. in "New diagnostics for physics studies on TEXTOR-94", Review of Scientific Instruments, Vol. 72, Pages 1046-1053, the particles that constitute the impurities in the plasma—hereinafter referred to as impurity particles—advance into regions of increasingly higher electron temperature, starting at the edge of the plasma towards the centre of the plasma, and are gradually ionized to ever higher degrees of ionization. The impurity particles are then present in the form of ions. At the same time, these ionized impurity particles—hereinafter referred to as impurity ions—are excited to emit characteristic spectral lines. In the experiment, spectral lines of higher degrees of ionization appear delayed in time compared to those of lower degrees of ionization. This delay between the appearances of two spectral lines of different degrees of ionization, $Z_1$ and $Z_2$, is a direct measure for the transport time that the impurity particles require for transport between those radial positions, $r_1$ and $r_2$, at which the emissivities of the observed spectral lines are located. The accuracy of the described method is dependent on the ability to observe simultaneously as many different spectral lines of different degrees of ionization as possible, with a good signal-to-noise ratio and sufficient time resolution.

Preliminary tests showed for typical conditions in a fusion experiment that, as a rule, a time resolution of 1 ms is necessary in order to be able to resolve sufficiently the delay between spectral lines of different degrees of ionization by means of measurement technology. Continuous measurement should be possible over the total discharge duration of a typical plasma (6 to 10 seconds) in order to be able to record all processes during the discharge that are interesting to physics.

The discrimination between spectral lines and the background as well as the separation of different spectral lines can only be achieved, as a rule, by using suitable spectrometers having sufficient wavelength resolution. The method's applicability to as many different relevant plasma impurities as possible, after all, determines the wavelength range in VUV (Vacuum Ultraviolet, approx. 10 nm-100 nm) which is to be observed, since in this range, the impurities relevant to fusion experiments show many of their strongest spectral lines.

The requirements with regard to measurement technology and especially regarding the spectrometer used for the planned tests can therefore be summarized as follows:
a) The spectrometer should be able to work over a broad wavelength range in the VUV (10-100 nm).
b) The spectrometer should be able to perform measurements with a high degree of time resolution, namely at least 1000 complete spectra per second.
c) The efficiency of the spectrometer should be high, since the signal-to-noise ratio also depends on the photon statistics.
d) The spectrometer should have sufficient wavelength resolution (line separation).
e) The spectrometer should have a wide dynamic range since the intensities of the individual spectral lines vary greatly.

The spectrometer concept "SPRED" (Survey Poor Resolution Extended Domain) which is presented in works by Fonck et al., Appl. Optics Vol. 21, page 2115 et sqq. (1982), as well as by Stratton et al., Reviews of Scientific instruments Vol. 57, page 2043 et sqq. (1986), was found to be the closest state of the art at the moment able to meet the above-mentioned requirements.

The spectrometer concept may be summarized briefly as follows: the centerpiece of the spectrometer is a diffraction grating by Jobin-Yvon with the following properties:
I. Oblique incidence of light at approx. 70 degrees from the normal of the grating for obtaining sufficient reflectivity of the coating of the grating in the range of under 50 nm.
II. Toroidal grating substrate for reducing the geometric loss of light through astigmatism. Efficiency is thus enhanced.
III. The grooves of the grating are produced by ion etching or holographically. Thus, a high degree of efficiency is obtained in the first diffraction order while at the same time, higher diffraction orders are suppressed. Furthermore, a reduction of image defects is achieved and a sharp spectrum in a plane of 40 mm width is obtained.
IV. The grating surface is coated with gold in order to improve efficiency in a wavelength range of under 30 nm.
V. The lengths of the two arms of the spectrometer (which is to be understood as being the distance entrance slit—grating or grating—detector) are chosen to be approx. 30 cm each, so that, for the size of gratings and groove densities that can be produced today, the result is an instrument with a large wavelength range of sufficient wavelength resolution and large aperture (f/30), and thus with a high degree of efficiency.

The diffraction grating creates images of the entrance slit in the exit plane of the spectrometer of a scale of approx. 1:1.

An open MCP detector ("Multi Channel Plate") is used in the exit plane of the spectrometer for converting the VUV photons into visible light and amplifying the signals at the same time. The whole spectrometer is operated in a vacuum because radiation in the wavelength range of 10-100 nm is absorbed by all gases and all materials. The operation of the open MCP detectors furthermore necessitates a pressure of under $10^{-6}$ mbar, so that a UHV set-up is necessary for the whole spectrometer (UHV: Ultra High Vacuum).

The technical requirements desired according to a) to e) make it necessary to make specific improvements in certain points on the devices known from the above-mentioned state of the art.

The object of the invention is the creation of an apparatus of the kind mentioned at the beginning with which the transport of impurities in a plasma can be measured more accurately than was possible up to now.

The object is achieved by an apparatus having the characterizing features of the main claim. Advantageous embodiments result from the dependent claims.

SUMMARY OF THE INVENTION

The apparatus according to the invention comprises a spectrometer, means for the spatially-resolving conversion into charge of light exiting the spectrometer, an integrator circuit for the spatially-resolving integration of the charge, as well as means for displaying the charge that is integrated dependent on the position. The integrator circuit is assembled from discrete components.

The inventor has recognized that the integrator circuit must be modified compared to the state of the art in order to achieve the object of the invention. In particular, the inventor has recognized that the previous path, namely to use integrated circuits, must be abandoned, and that the object can only be achieved by assembling the integrator circuit from discrete components. Discrete components that are suitable for the implementation arise from the exemplary embodiment.

A large dynamic range at high time resolution (because of the given values for noise level and "full-well-capacity" of the camera head which is to be connected in series) leads to high total intensities of the amplified spectra at the output, for which an open MCP detector, for example, then has to be constructed accordingly. By means of a one-stage standard MCP (with a length/diameter ratio of the individual channels of 40:1), a current gain of maximally only about 3000 can be reached. As a rule, such a gain is insufficient. A multistage standard MCP, as a rule, leads to a large spatial broadening (degradation of the spatial resolution and thus the wavelength resolution of the total system). Therefore, the MCP is regularly designed as an EDR-MCP ("Extended dynamic range", i.e. a dynamic range extended by the factor 10) with a length/diameter ratio of the individual channels of in particular 60:1 (i.e. total gain higher by a factor of 30). It is essential in this embodiment that the total gain is substantially larger compared to the above mentioned insufficient gain.

The MCP surface is preferably coated with CsJ in order to increase efficiency (quantum yield).

For the series-connected phosphor screen for the conversion of the electron pulse into visible light, a special, very fast phosphor (Type P46) is chosen in particular, whose afterglow/decay time (some 10 µs) is noticeably less than the desired time resolution of the total system, and which, in addition, has a large light yield in the wavelength range in which the series-connected camera head has its highest degree of efficiency (approx. 500-700 nm). Due to this design, a large gain of the MCP of up to $10^5$ can be achieved in total, at a high degree of efficiency, high time resolution and acceptable spatial resolution (minimum spot size at the output is approx. 60 µm).

In an embodiment of the invention, the diameter is chosen to be 40 mm (this is the largest available standard diameter) for the MCP and the screen so that the complete spectrum is shown on it. The spectral lines appear as thin lines on the surface of the phosphor screen which can be made out with the naked eye (images of the entrance slit).

Essentially, the spatial resolution of the MCP now also determines the optimum width for the entrance slit up to which the incident amount of light (and thus the efficiency of the complete system) can be increased, without a noticeable additional deterioration of the wavelength resolution occurring. Therefore, a width of 50 µm is preferably chosen.

If an additional increase of the incident amount of light is desired without a loss in resolution, the height of the slit is increased according to the invention. This necessitates (because of the 1:1 image in the spectrometer) a camera head for collecting the spectra whose sensor has as great a height as possible.

Design data on geometry and connection of the camera head. A camera head/detector is preferred for the collecting the spectra in the exit plane of the MCP detector (phosphor screen) that collects the complete spectrum (large sensor width) and collects as much light as possible (large sensor height, perpendicular to the dispersion direction of the spectrometer). Commercially available complete systems that have the required values of dimensions and time resolution are not existent. In particular, no commonly available two-dimensional detectors (e.g. CCDs) with the required measurements are in existence which allow for a complete readout with an image rate of 1000/s continually. There is, however, a one-dimensional sensor (N-MOS HAMAMATSU Type S3904-1024F with fiber optic entrance window and driver circuit type C4069) with a width of 25 mm (1024 pixel at 25 µm width each) and a height of 2.5 mm, as well as a specified pixel rate of up to 2 MHz.

PREFERRED EMBODIMENTS OF THE INVENTION

In one embodiment, a fiber optic cross-section converter (with a ratio of, for example 40/25) is mounted between the (phosphor) screen (width e.g. approx. 40 mm) and the sensor which makes the image (spectrum) smaller in the exemplary case. In this manner, an adjustment to the geometrical measurements of the sensor can be carried out. This fiber optic image is considerably more intense compared to an image created by means of lenses, and hence, is to be preferred for this application.

Since the permitted output intensity of the open MCP detector, modulated up to its linearity limit, does not suffice, as a rule, to modulate sensor S3904 (full capacity 25 pC) sufficiently, in a further embodiment, an image intensifier of the first generation ("diode") with a fiber optic coupling is interposed between the fiber optic cross-section converter and sensor that can bring about an additional linear light intensification by a factor of 10-15 without significant losses in spatial resolution.

In the following, an exemplary embodiment of the camera head will be described.

The operation of the used line array S3904-F with the dedicated circuit C 4069 by Hamamatsu requires two kinds of trigger signals that must be fed in from the outside: a trigger signal for starting a spectrum must be applied at the input "master start". 6 trigger pulses per pixel must be applied to the input "master clock" in order to "push out" the charge accumulated on a pixel. Measurement of 1000 spectra per second therefore requires, in addition to the trigger signal for the spectrum rate (1 kHz), a trigger signal of six times the pixel rate, which, at 1024 pixels as well as 1000 spectra per second, yields a trigger frequency of slightly more than 6 MHz. For this task, a commercially available standard quartz (6.55 MHz) was selected. The previously described assembly already permits observation of primitive spectra on an oscilloscope (signal output "data video" or "video out"), for example, when such suitable trigger pulses are applied to the circuit board C4069. However, the form of the signals of "video out" is given by a series of short-duration pulses which are hereinafter referred to as "spikes" (half-intensity width approx. 100 ns), and which are very difficult to collect by means of measurement technology. The physical raw signal which is the actual signal to be measured is the quantity of charge accumulated on one pixel of the line array since the last measurement (previous spectrum). This quantity of charge is proportional to the area under the spikes at the signal output "video out". A correctly measured collection of these signals therefore requires integration of the spikes over time in order to obtain a signal that is proportional to their area. After the measurement of the integrated signal, this must be deleted in order to reset the circuit before the spike which is to be measured next (switched integrator). Since the spikes are of short duration and the analog signal between two spikes corresponds to zero voltage, an additional analog switch before the input of the integrator is not necessary.

Figure 1:
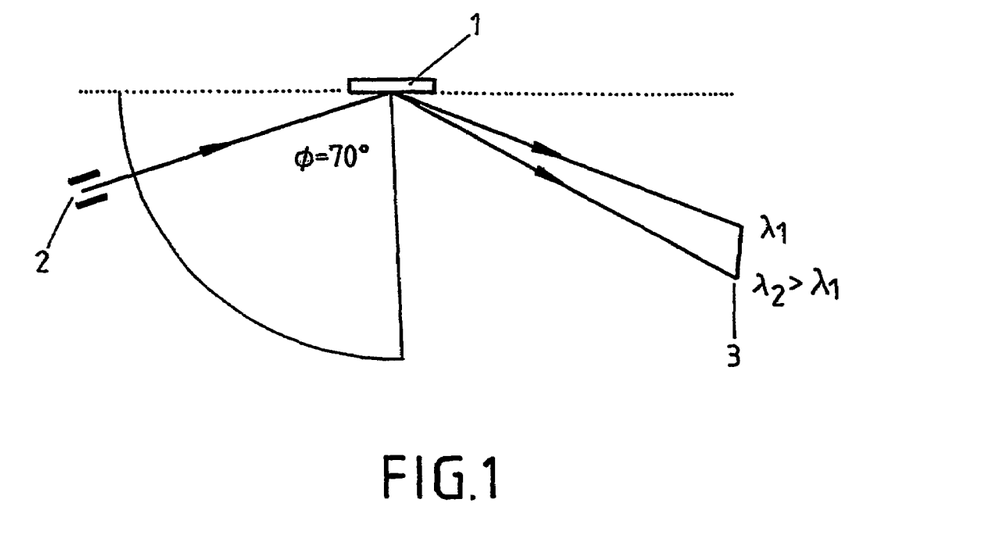
FIG. 1 is a diagram setting forth the basic structure of the present invention.
Figure 2:
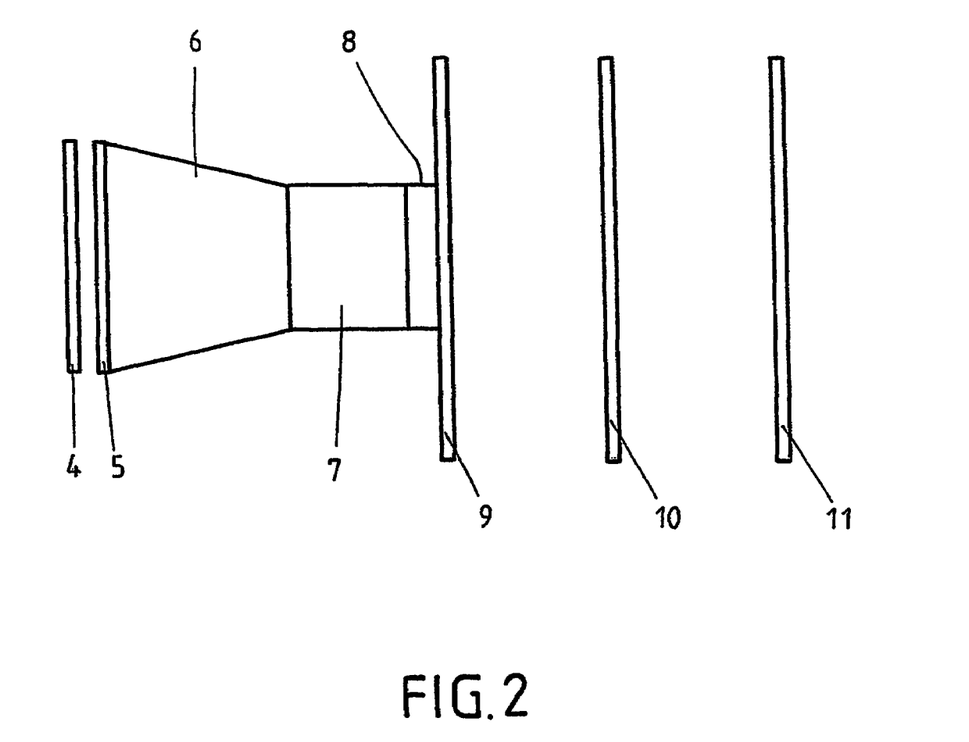
FIG. 2 is a diagrammatic representation of the orientation of the MCP, fiber optic coupler and image amplifier, and other components of the invention.
Figure 3:
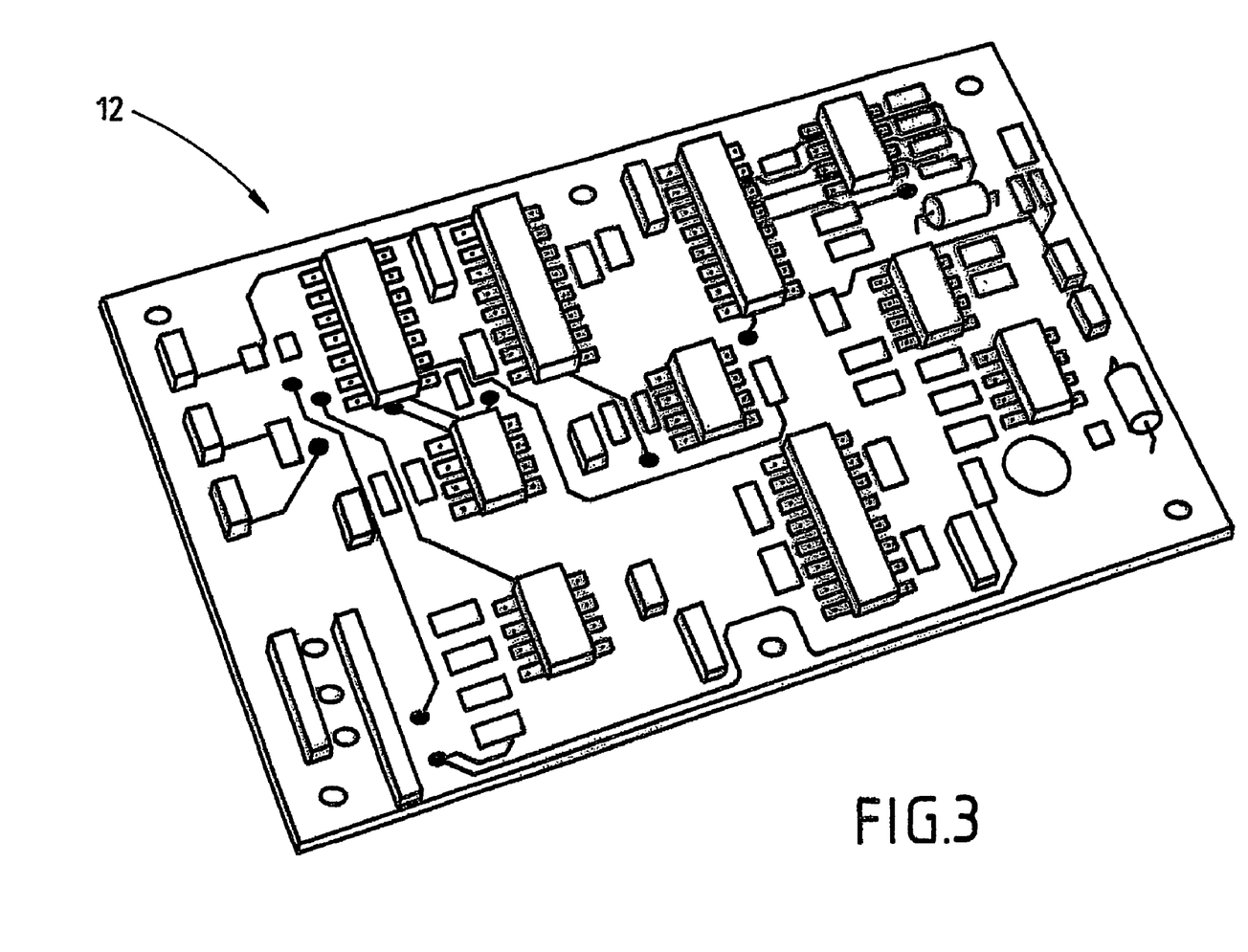
FIG. 3 is a perspective view of a representative circuit board of the integrator of the present invention.
Figure 4:
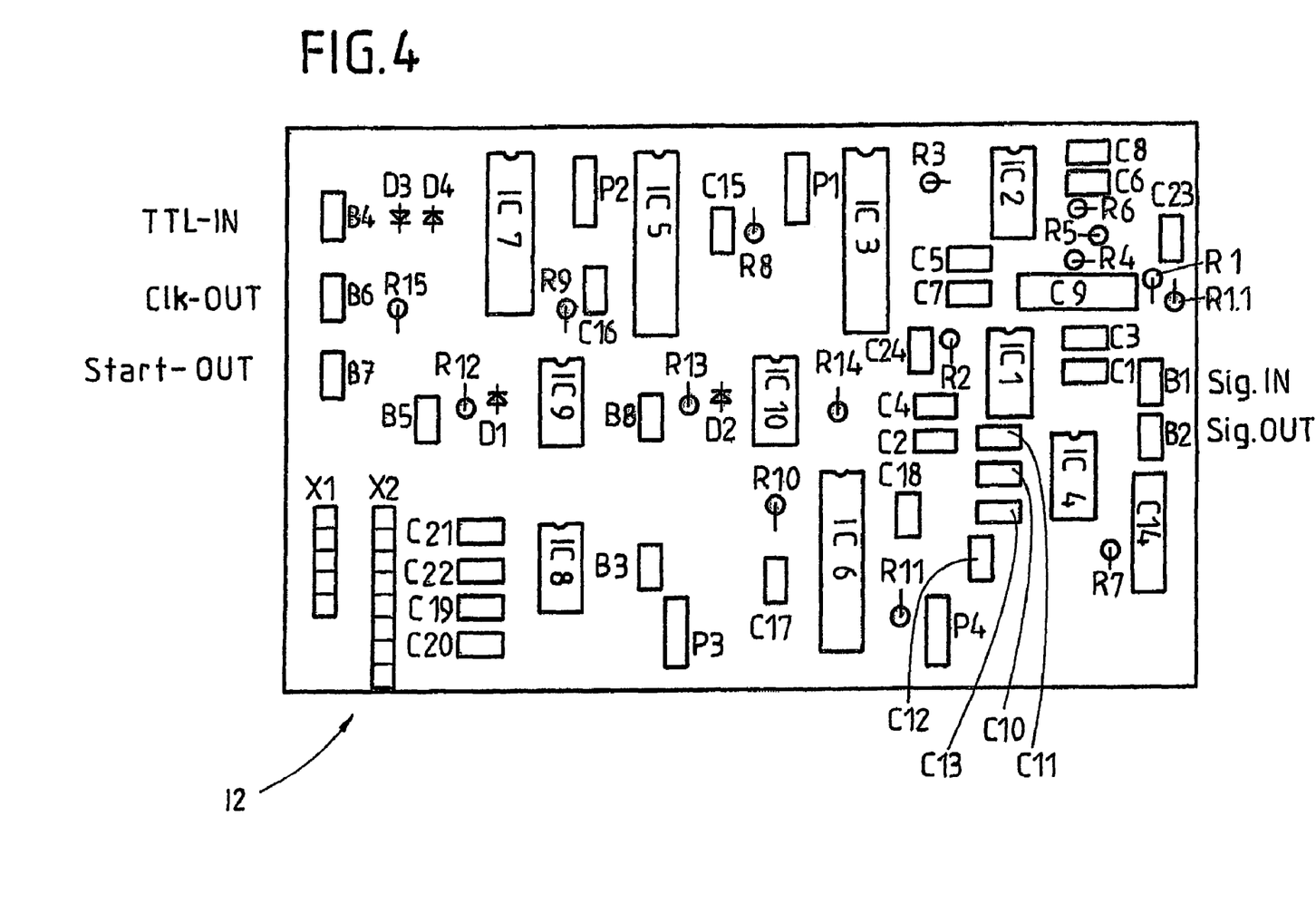
FIG. 4 is a top plan view of the orientation of components on the circuit board.
Figure 5:
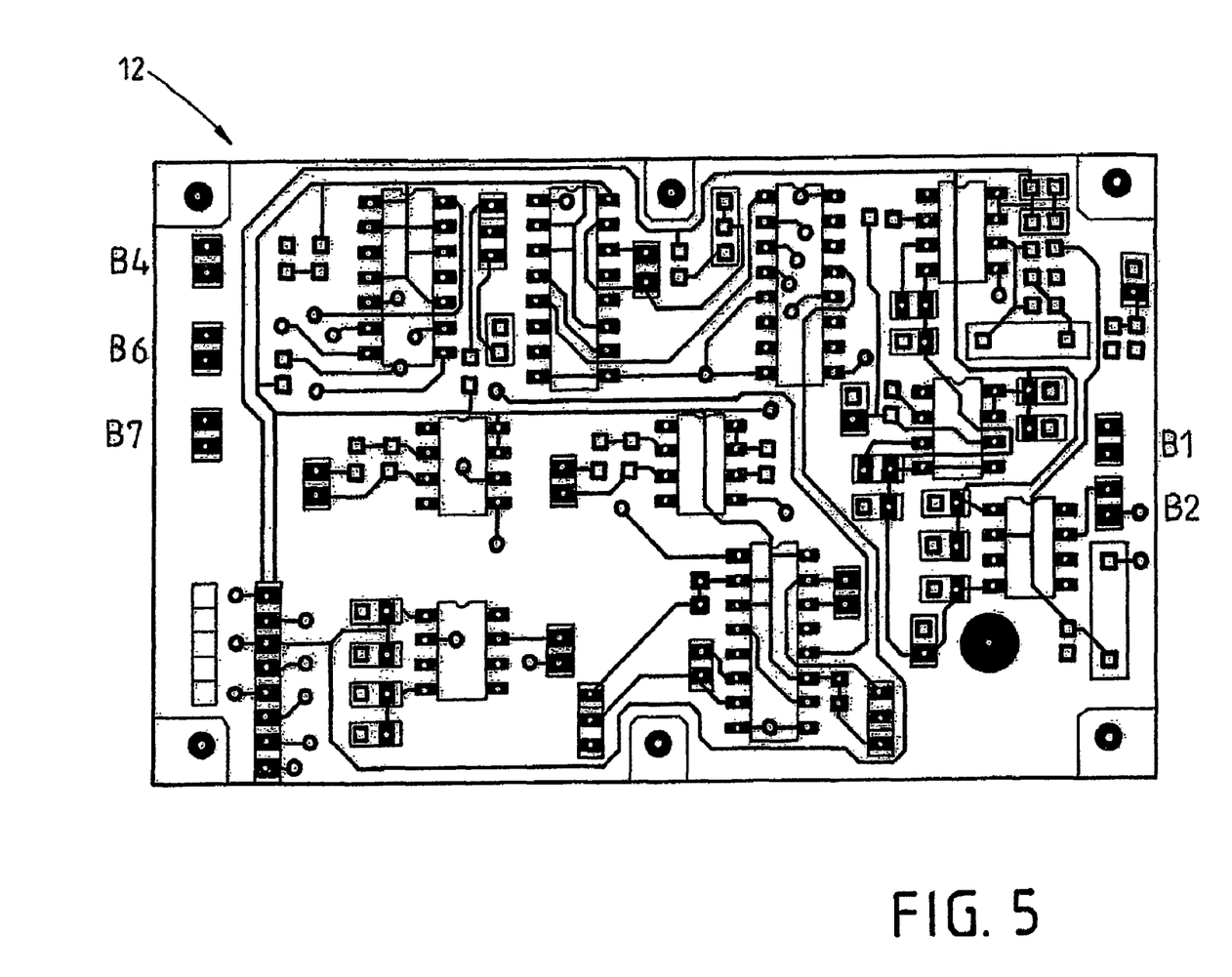
FIG. 5 is a bottom plan view of the circuit board depicting the interconnection of circuit elements thereon.
Figure 6:
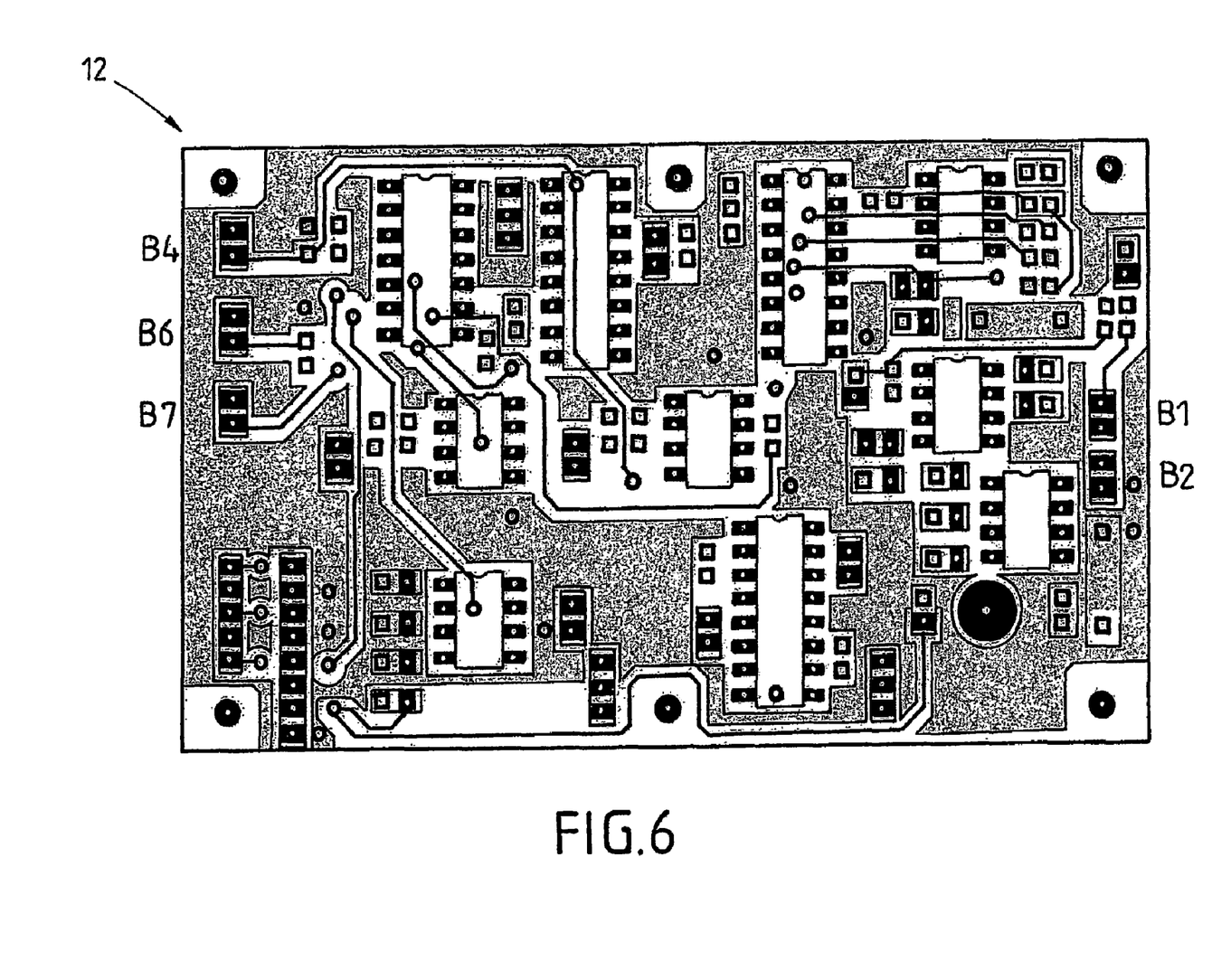
FIG. 6 is a view of the circuit board further depicting the arrangement of the components thereon.

FIGS. 1 and 2 illustrate the basic structure. The following figures illustrate the electronics.

In the following, an example for an analog part of the integrating circuit will be described in detail.

ICs with switched integrators (e.g. Burr-Brown IVC 102) are commercially available, which, at a time constant ("settling time") of 6 µs, permit the Integration of a maximum $10^5$ pulses per second; that is too slow by one order of magnitude for an application according to the invention. Therefore, according to the invention, a circuit made of discrete components is provided for this task, as can be seen from the figures.

Figure 7:
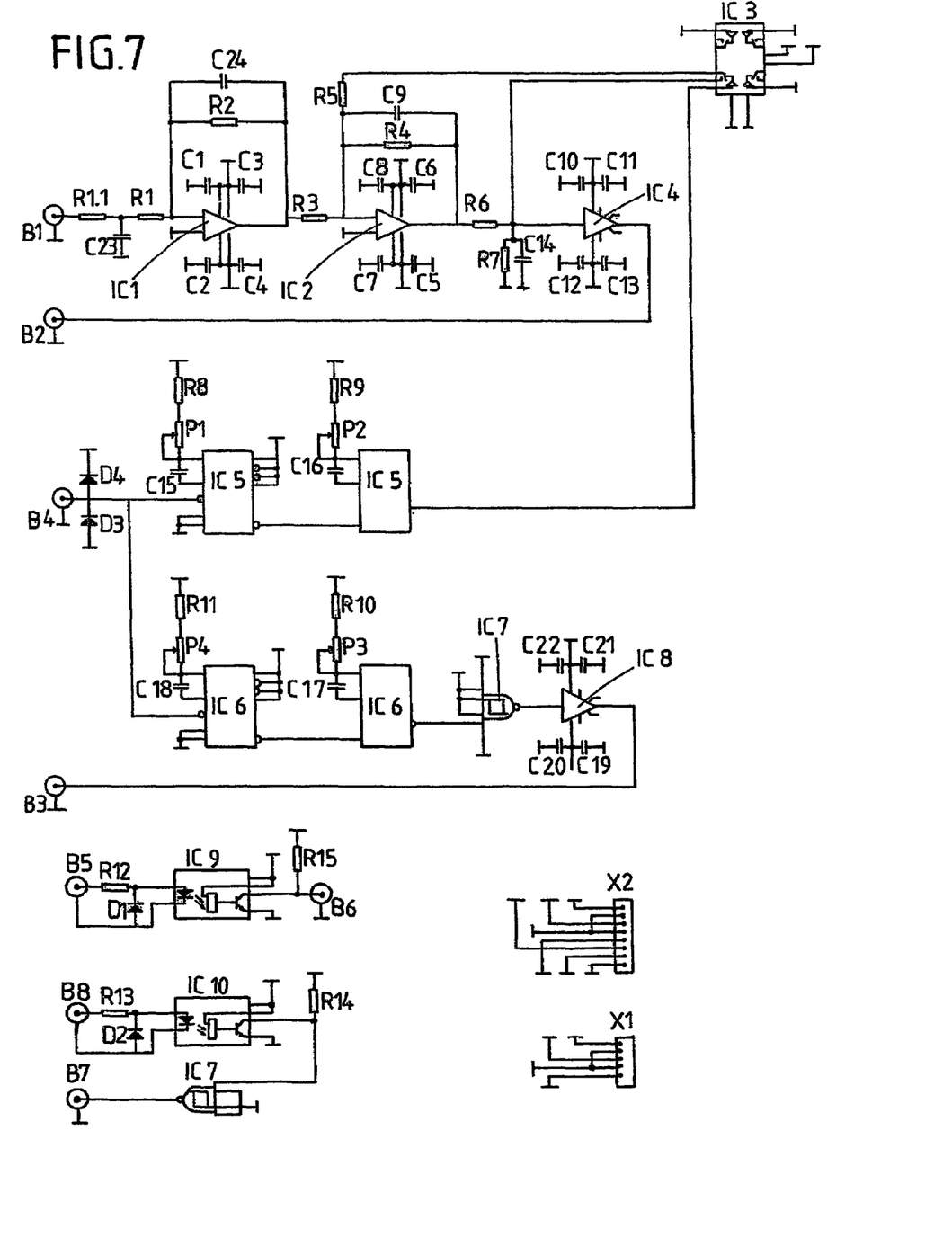
FIG. 7 is a schematic diagram of the invention.
Figure 8:
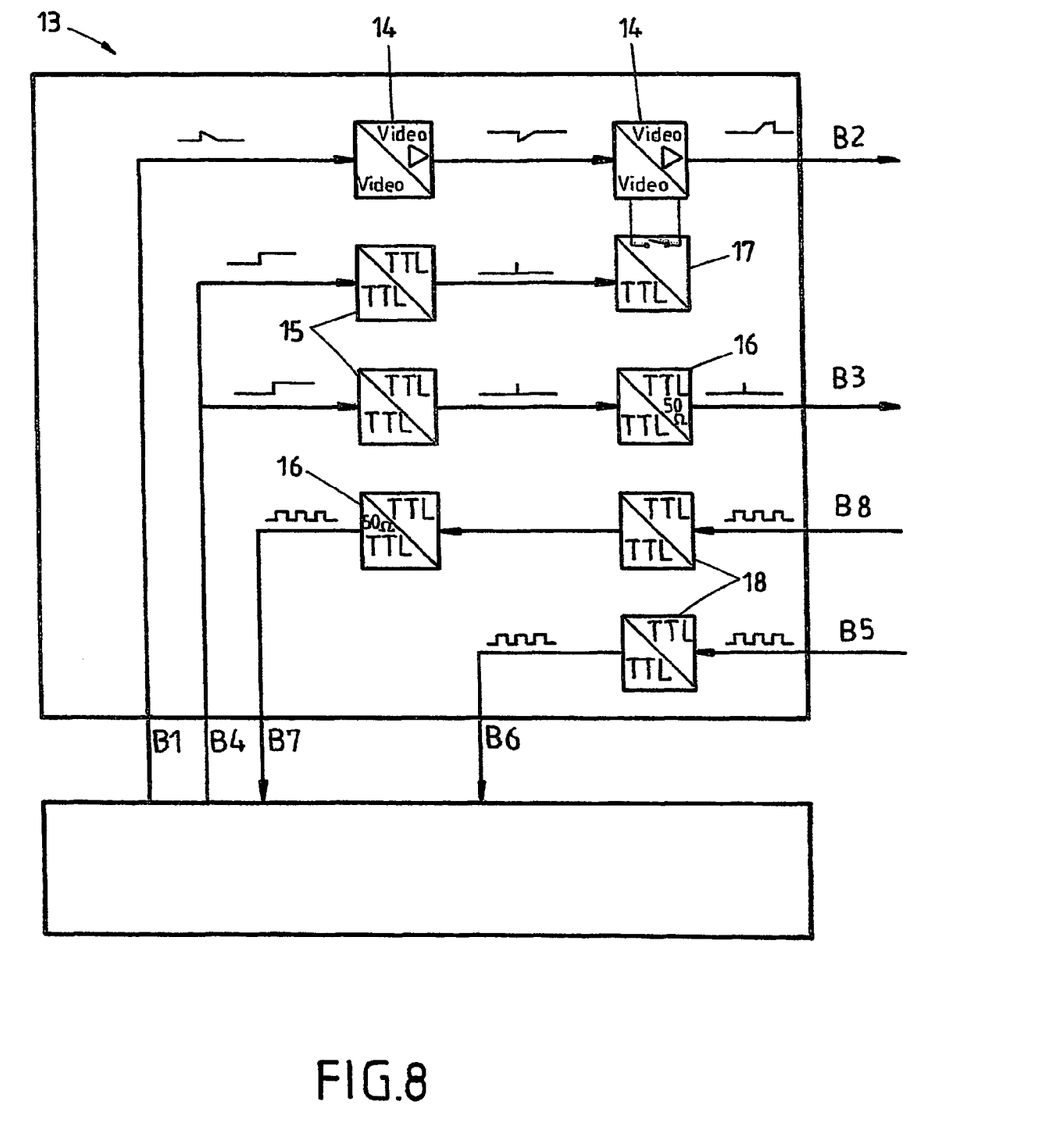
FIG. 8 is a depiction of signal flow on the expansion circuit board.

The centerpiece is a switched (inverting) integrator consisting of a fast operational amplifier IC2 (Burr-Brown OPA655, 400 MHz), a resistor R3 (300) and a capacitor C9 (162 pF), with a fast switch IC3 (Siliconix DG 612) being connected in parallel to the capacitor C9 for deleting.

An inverting amplifier IC1 (also OPA 655) is connected before the integrator for adjusting the level, impedance transformation and inversion of the analog input signals (those are the spikes from the circuit board C4069, connected to socket B1). When the switch is open, the integrator integrates the applied input voltage according to $$U_{out} = -(1/RC) \int U_{in} dt + U_0.$$

The selection of R3 and C9 leads to a time constant RC>>50 ns, which is chosen to be slightly less than the half-intensity width of the spikes so that, only a short time after the peak of the spike, a signal that is practically constant in time is obtained. However, it must not be selected too small, so that an overdrive of the operational amplifier in the integrator is avoided.

Deleting the integrated voltage (resetting the capacitor to the initial value of $U_0=0$) is carried out by closing the switch IC3. In the circuit between capacitor and switch, there are the resistors R5 and R6 (44 Ohm each) which, together with the internal resistance of the switch, make sure that the maximum permitted current in the switch IC3 ($I_{max}=30$ mA) is not exceeded during the deleting: The following is valid for the integrator op-amp: $U_{max}=3.5$ Volts, and $R_{total}=$ (2*44+45) Ohms yields $I_{max}=26$ mA. On the other hand, the time constant of the integrator circuit is RC=21 ns, so that a far-reaching depletion of the capacitor to a voltage of less than 0.1% of the initial value can be reached within approx 160 ns, i.e. the next value is independent from its precursor. The integrated measurement signal is at last output to a BNC socket (B2) via the line driver IC4 (Elantec EL 2003), where the component IC4 makes the connection of a long BNC line (in this case 30 m) with 50 Ohms termination possible.

The trigger electronics on the integrator circuit board are built up as follows.

Elements of the trigger electronics are mounted on the integrator circuit board that serve the purpose of operating the integrator at the right times (integrating/deleting) and of outputting a trigger signal for the data recording which is to be done subsequently. A trigger signal (one pulse per pixel), coming from the circuit board C4069, is fed in over the socket B4. This input signal is branched to the ICs 5 and 6. At IC5 (Monoflop 74HC221), the pulse operating the integrator is generated; the starting time of the deleting pulse (set to 550 ns after the peak of the spike) can be set, continually adjustably, by means of the potentiometer P1, and the duration of the deleting pulse (set to 160 ns) by means of the potentiometer P2, also continually adjustably. The trigger pulse for the data recording which is to be done subsequently is generated at IC6 (timer component 74HC221); its starting time (set to 500 ns) can be set by means of the potentiometer P3 and the duration of the pulse (set to 100 ns) can be set by potentiometer P4. This trigger pulse is output to the BNC socket B3 via the driver IC8. Deletion of the integrated signal therefore takes place shortly (50 ns) after it has been measured, and then, the integrator is again ready for measuring on time (approx. 710 ns after the peak of the previous signal).

The external triggering will now be explained.

Measuring exactly 1000 complete spectra per second requires feeding a trigger signal for the rate of spectra ("master start", 1 kHz) as well an additional trigger signal ("master clock") consisting of exactly 6*1024 pulses which must be applied within a time frame of less than 1 ms (else, the pixels that have to be read out already overlap with the next spectrum). The data sheet for C4069 allows for a master clock of maximally 6*2 MHz, however, according to the invention, a frequency of 6.55 MHz was selected in order to increase the time between two consecutive spikes as much as possible and to simplify the timing for the operation of the integrator. The two clock frequencies required for C4069 can be generated by means of programmable pulse generators.

In order to ensure a galvanic insulation between the pulse generators and the camera head (this is necessary to avoid "ground loops" that could lead to disturbances in the measuring signals), the pulses "master start" and "master clock" are, at first, led over the BNC sockets B5 and B8, respectively, and fast optical couplers (IC9, IC 10, both OPTOISO1). Furthermore, the "master start" signal is inverted at IC7 (74S140), and then, both signals are transferred to the circuit board C4069 via the sockets B6 and B7, respectively. These optical couplers are mounted on the integrator circuit board for reasons of space.

In the following, the voltage supply will be described more closely.

For operation, the integrator circuit board requires highly stabilized DC voltages +5 V, −5 V, +15 V, −15 V and +6 V that are generated on a separate circuit board (within the camera head).

A mechanical housing contains the circuit boards C4069, the integrator circuit board and the voltage supply circuit board. The circuit board is mounted movably and is pressed to the output of the fiber optic coupler on the MCP detector by means of a simple spring mechanism, when the camera head is mounted to the spectrometer, in order to obtain a good optical contact between the two light conductors (entrance window of the line array/fiber optic coupler). From the outside, an alternating current (two times 18 Volts) is fed into the housing via an insulated socket. Furthermore, there are insulated BNC sockets for the trigger inputs (master start and master clock), the trigger output and the integrated analog signal.

Measures for shielding from electric and magnetic disturbances are provided as follows.

The occurrence of considerable electromagnetic disturbances must be reckoned with during the camera head's operation in the plasma experiment TEXTOR, against which the camera head must be shielded. The following measures were taken in order to shield the camera head against these disturbances: metal housing (aluminum) of the camera head for shielding from electromagnetic fields. A further encasing housing (soft iron) for shielding from magnetic fields. All BNC cable joints between the camera head and data recording/triggering are designed as a cable bundle of 30 m length in a joint copper pipe. The signal ground for the camera head is fed shielded to the camera head by a grounding bar at the data recording PC. All other connections of the camera head are joined free-of-ground or insulated. By means of these measures, it is achieved that the analog signals of the camera head can be measured with a noise level of less than 1 mV, while, at the same time, the position of the line array (correlation of pixel number and wavelength) remains stable. For recording the spectra, a commercial Windows 95 PC is used with a data acquisition card of the Type T112-4 (Co. Imtec, 71522 Backnang) and data acquisition software INSIGHT (Imtec). Under external triggering (in this case approx. 1.08 MHz), the system can record the analog data of up to 4 channels simultaneously, continually at a resolution of 12 bit, and buffer them in the PC's RAM. Given a size of RAM of 256 MB, the data of 3 connected camera heads are recorded at TEXTOR continually over a total measurement time of 10 seconds. The analog bandwidth of the card of 500 kHz leads to the digitized measurement values recording an average value over time via the analog signal of the camera head, whereby the averaging time is approximately 350 ns. This time roughly corresponds to the time during which the integrated analog signal of the camera head assumes a constant value over time between the end of the spike and the start of the deleting pulse. The data recording used corresponds to the state of the art and therefore, is not subject of this patent application.

In total, the camera head runs at a continuous rate of spectra of 1000 per second with a pixel rate of 1.08 MHz, and, during practical operation, reaches a dynamic range for the individual pixel (distance between noise and modulation limit) of 10-11 bit. The above-discussed design of the individual components leads to the limit of the linearity range of the MCP being reached just when the IC OPA655 in the integrator circuit board has reached saturation (approx. 3V). During operation the with data recording (range of measurement 0 . . . 5 Volts), this corresponds to a utilizable linearity range of 2000 counts at approx. 1 count noise (i.e. 11 bit utilizable resolution of the complete system).

List of reference numerals

| | |
|---|---|
| 1 | Diffraction grating |
| 2 | Entrance slit |
| 3 | Focal plane |
| 4 | MCP |
| 5 | Screen |
| 6 | Fiber optic coupler |
| 7 | Image amplifier |
| 8 | S3904 - F |
| 9 | C 4069 |
| 10 | Integrator circuit board |
| 11 | DC voltage source |
| 12 | Integrator circuit board |
| 13 | Expansion circuit board |
| 14 | Inverter |
| 15 | Pulse shaper |
| 16 | Line driver |
| 17 | Analog switch |
| 18 | Optical coupler |

The invention claimed is:

1. Apparatus for measuring the transport time of impurity particles in a plasma comprising:
   a spectrometer
   means for the spatially-resolving conversion of light exiting the spectrometer into charge,
   an integrator circuit for the spatially-resolving integration of the charge, and
   means for displaying the charge that is integrated dependent on its position,
   characterized in that
   the integrator circuit is assembled from discrete components comprising a fast response operational amplifier, a quick operating switch, a network having a time constant of 21 ns comprising a first resistor and a capacitor, a line driver, second and third resistors, and the means for conversion comprises an EDR-MCP detector, an output of which is coupled to an input of the integrator circuit, wherein the operational amplifier, the first resistor and the capacitor are interconnected with one another and the second and third resistors are arranged between the capacitor and the switch and, together with the internal resistance of the switch, provide for the deletion of signals of the capacitor in about 50 ns and the prevention of switch currents beyond an allowed maximum.

2. Apparatus according to claim 1, wherein the MCP detector has a detector surface coated with CsI.

3. Apparatus according to claim 1, the EDR-MCP detector further comprising a phosphor screen for the conversion of an electron pulse into visible light, with an afterglow/decay time of up to 100 μs.

4. Apparatus according to claim 3, wherein the afterglow/decay time is up to 30 μs.

5. Apparatus according to claim 1, the EDR-MCP detector further comprising a phosphor screen and a sensor with a fiber optic cross-section converter being mounted therebetween.

6. Apparatus according to claim 5, the EDR-MCP detector further comprising a image intensifying diode which is provided between the fiber optic cross-section converter and the sensor.

* * * * *